June 3, 1958
E. J. McILVRIED
2,837,206
DRAW BENCH
Filed Dec. 2, 1953
3 Sheets-Sheet 1
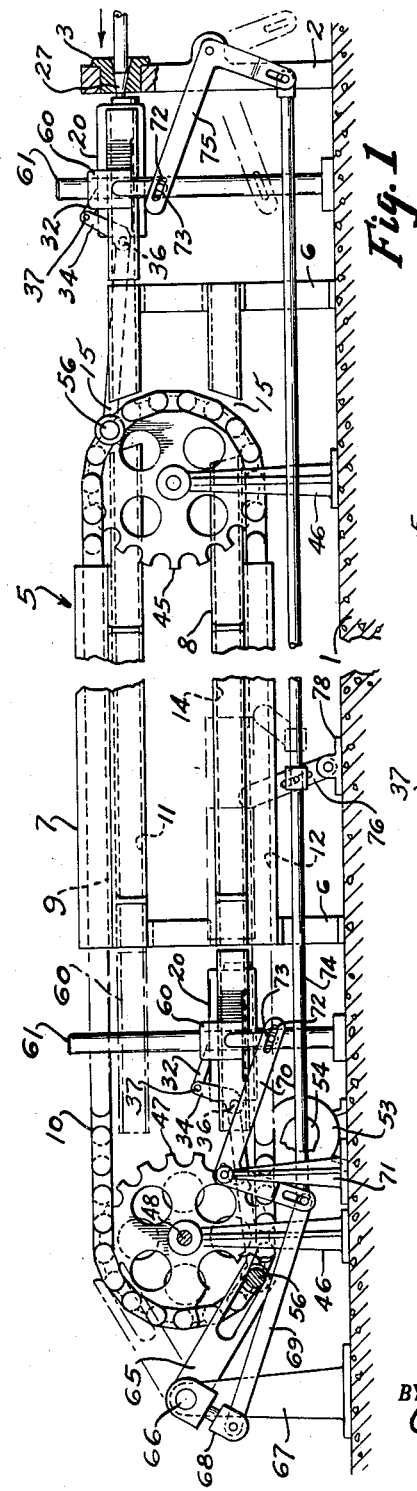
INVENTOR.
EDWIN J. McILVRIED
BY Oberlin + Limbach
ATTORNEYS June 3, 1958　　　E. J. McILVRIED　　　2,837,206
DRAW BENCH
Filed Dec. 2, 1953　　　　　　　　　　3 Sheets-Sheet 2
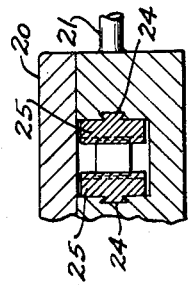
Fig.6
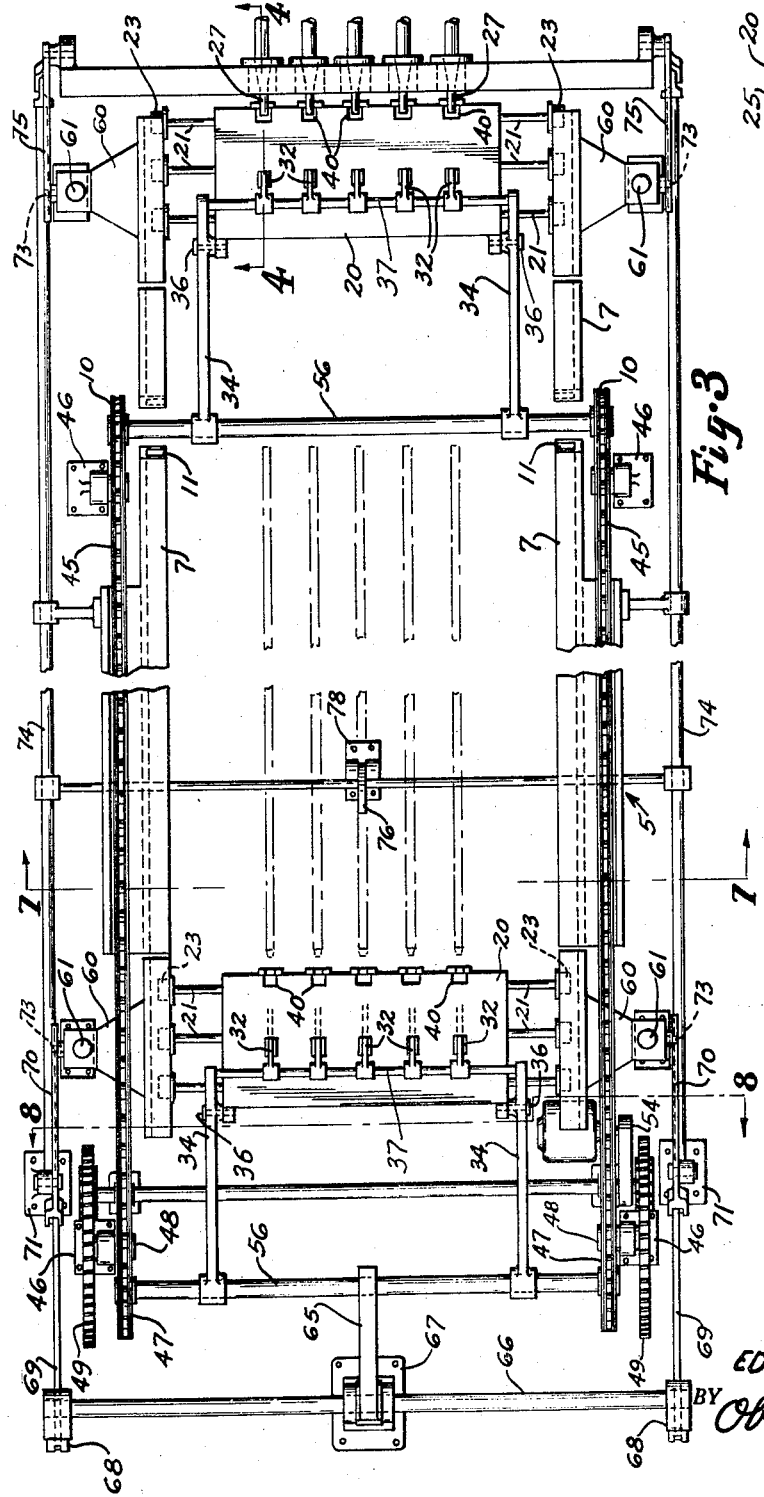
Fig.3
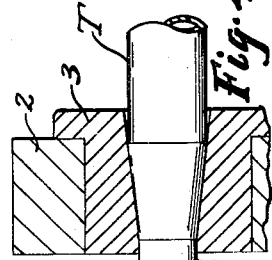
Fig.4
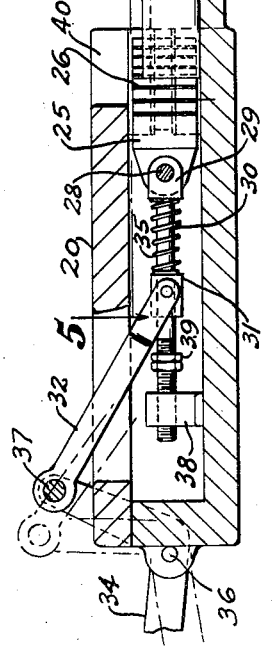
INVENTOR.
EDWIN J. McILVRIED
BY Oberlin + Limbach
ATTORNEYS INVENTOR.
EDWIN J. McILVRIED
BY Oberlin & Limbach
ATTORNEYS though the endless drive chain is employed to effect both the drawing and return movements of the carriage, much productive time is lost in awaiting the return of the carriage to the drawing position. In the case of tube drawing, for example, an operator can thread several tubes onto a corresponding number of mandrels of a workpiece loader during the drawing of the tubes previously loaded onto a different set of mandrels of said loader. This loading of tubes onto mandrels can be accomplished within a fraction of a minute (approximately ⅓ of a minute for three tubes), and, of course, it only takes a few seconds time after the completion of the drawing operation to shift the loader to a position whereat the tubes to be drawn are aligned with the drawing dies and to thrust the pointed ends of the tubes through said dies into position for gripping by the jaws of the draw carriage.

2,837,206

DRAW BENCH

Edwin J. McIlvried, Medina, Ohio, assignor to The Vaughn Machinery Company, Cuyahoga Falls, Ohio, a corporation of Ohio Application December 2, 1953, Serial No. 395,775

7 Claims. (Cl. 205—3)

The present invention relates generally as indicated to a draw bench, and more particularly to a draw bench of the type wherein a carriage equipped with workpiece gripping jaws is first moved in one direction to draw a workpiece gripped thereby through a die, and is then moved in the opposite direction to a position adjacent said die preparatory to gripping and drawing the next workpiece.

In the early forms of draw benches for drawing tubes, for example, a carriage or truck having tube gripping tongs was hooked to an endless chain, the top course of which traveled along the top of the draw bench, thus pulling the carriage and drawing the tube gripped thereby. The carriage was then returned manually or otherwise to a position adjacent the die preparatory to grasping the next tube and drawing the same by hooking of the carriage to said endless drive chain. In later improvements such as disclosed in the Edwin J. McIlvried et al. Patents Nos. 2,367,793 and 2,554,998, granted January 23, 1945, and May 29, 1951, respectively, both the top and bottom courses of the endless drive chain are employed to effect drawing movement and return movement of the carriage.

A characteristic feature of the prior draw benches just referred to is that the carriage is reciprocably mounted on a single track or guide; and, therefore, even if the endless drive chain is employed to effect both the drawing and return movements of the carriage, much productive time is lost in awaiting the return of the carriage to the drawing position. In the case of tube drawing, for example, an operator can thread several tubes onto a corresponding number of mandrels of a workpiece loader during the drawing of the tubes previously loaded onto a different set of mandrels of said loader. This loading of tubes onto mandrels can be accomplished within a fraction of a minute (approximately ⅓ of a minute for three tubes), and, of course, it only takes a few seconds time after the completion of the drawing operation to shift the loader to a position whereat the tubes to be drawn are aligned with the drawing dies and to thrust the pointed ends of the tubes through said dies into position for gripping by the jaws of the draw carriage.

Moreover, the use of high-power carriage drive mechanism for slow, no-load return of the carriage is an inefficient use of such drive mechanism. On the other hand, quick-return of the carriage involves added equipment cost in the way of change-speed gearing or separate drive means and automatic control mechanism therefor.

Two seemingly obvious solutions to the foregoing problems are either to employ two draw benches operated in phase opposition or to employ two loaders and two sets of dies at opposite ends of a draw bench, but both of these expedients have certain disadvantages such as yet requiring two operators, and in the last-mentioned expedient, several hundred feet of space may be required from the end of one loader to the end of the other loader.

Accordingly, it is one main object of the present invention to provide a draw bench which employs a plurality of carriages so arranged that, during the drawing of a workpiece or workpieces by one carriage, another carriage is at the same time returning toward drawing position whereby, upon completion of the drawing operation by said one carriage, said another carriage has completed its return movement and is ready to grip and to draw a succeeding workpiece or workpieces.

Another object of this invention is to provide a draw bench in which a plurality of carriages, having a cyclic path of movement, are spaced apart from one another in such path a distance at least equal to the length of the drawn workpiece so that, upon completion of the drawing operation by one carriage, a succeeding carriage will have been returned to a position adjacent the die to grip, and to commence the drawing of, the next workpiece.

Another object of this invention is to provide a draw bench wherein a plurality of carriages travel in a closed circuit or path which includes side-by-side portions along which the carriages are moved in opposite directions, viz. away from and toward the die.

Another object of this invention is to provide a draw bench which is equipped with at least two tracks for a plurality of carriages, the carriages being shifted or transferred from one track to another at the conclusion of their drawing and return movements.

Another object of this invention is to provide a draw bench in which the carriage drive means is effective to automatically close the workpiece gripping jaws of successive carriages when the latter move to a position adjacent the die and to automatically open said jaws of successive carriages at the conclusion of the drawing operation thereof.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail one illustrative embodiment of the invention, this being indicative, however, of but one of the various ways in which the principle of the invention may be employed.

In said annexed drawings:

Fig. 1 is a side elevation view of one illustrative embodiment of the present invention showing one carriage ready to commence its drawing movement and another carriage ready to commence its return movement;

Fig. 2 is a side elevation view of the lefthand end portion of the draw bench of Fig. 1 showing the carriage shifting mechanism;

Fig. 3 is a top plan view of the draw bench illustrated in Fig. 1;

Fig. 4 is a cross-section view through one set of workpiece gripping jaws of a carriage to show the actuating mechanism therefor, such section having been taken substantially along the line 4—4, Fig. 3;

Figure 7:
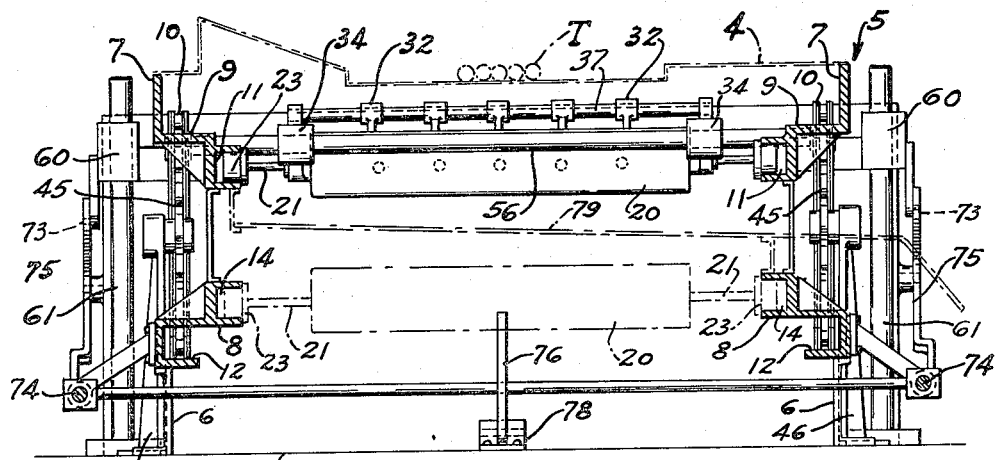
Figure 8:
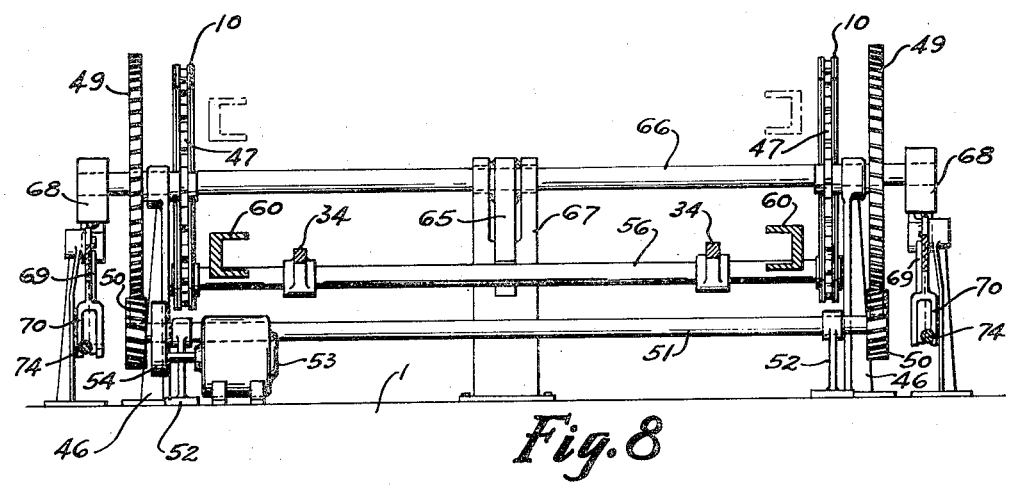
Figure 5:
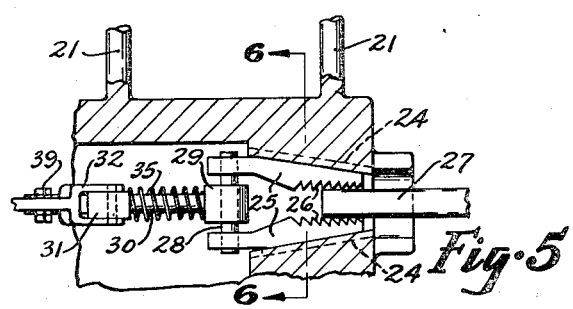
Fig. 5 is a fragmentary cross-section view through the carriage as taken substantially along the line 5—5, Fig. 4.

Fig. 6 is a fragmentary cross-section view taken substantially along the line 6—6, Fig. 5; and Figs. 7 and 8 are transverse cross-section views taken substantially along the lines 7—7 and 8—8, Fig. 3.

Broadly stated, the present invention comprises a draw bench having a die mount at one end thereof in which one or more dies are mounted, and a plurality of draw carriages driven by endless drive chains in a cyclic path as follows:

(1) One carriage, at the conclusion of its return movement along a return track, is shifted transversely to a position adjacent said die to grip the pointed end of a workpiece to be drawn; and at the same time, another carriage, having concluded its drawing movement along a draw track and having released its grip on the workpiece drawn thereby, is shifted transversely to a position in alignment with the return track;

(2) Said one carriage is then pulled along the draw track to draw the workpiece grasped thereby through the die; and at the same time, said another carriage is being moved along the return track toward the die mount; and (3) At the conclusion of the drawing and return movements of the carriages, they are again operated to release the drawn workpiece followed by transverse shifting thereof in preparation for gripping and drawing movement and for return movement, respectively.

As evident from the foregoing outline, the provision of two tracks and two carriages makes possible a substantially increased productivity of the draw bench (as compared with prior draw benches) by eliminating idle return movement of a single draw carriage along a single track.

Having thus described the operation of the present draw bench in very general terms, reference will now be made to the detail structure of the illustrated embodiment under the following headings, viz.

I. The Draw Bench Proper;
II. The Draw Carriages and Workpiece Grasping Jaws;
III. The Carriage Drive Mechanism; and
IV. The Carriage Transfer and Jaw Operating Mechanisms.

I. THE DRAW BENCH PROPER

The draw bench illustrated in Figs. 1 to 6 comprises a bench or base structure 1 at one end of which is a die mount 2 in which one or more dies 3 are mounted, herein a series of five dies 3, preferably, but not necessarily, being disposed side-by-side in a horizontal plane.

Adjacent one side of said die mount 2 will be installed a workpiece loader (not shown) which, in association with a tube draw bench, may be of a familiar form such as shown in the E. J. McIlvried et al. Patent No. 2,492,876, that is to say that said loader will be equipped with two sets of mandrels alternately shiftable, by rotation or oscillation of the loader, from a position above said dies 3 to a position aligned with the latter. In such upper position of one set of mandrels, pointed tubes T on a loading rack 4 above the draw bench (see Fig. 7) may be threaded onto said mandrels, but before doing this, the pointed ends of the tubes T on the other set of mandrels will be thrust through said dies 3 (by movement of the mandrels or otherwise) preparatory to being grasped for the drawing operation.

The loading rack 4 is adapted to be mounted on the carriage and chain guide structure 5 to extend longitudinally of the draw bench 1.

Said carriage and chain guide structure 5 is shown as comprising paired brackets 6 to which are secured two pairs of longitudinally extending members 7 and 8 which are parallel to one another and parallel to the desired direction of drawing of tubes T through the dies 3.

The upper pair of longitudinally extending members 7 constitute a support for the loading rack 4 aforesaid and provide guides 9 for the top courses of a pair of endless drive chains 10 and also provide opposed channel-like carriage guides or tracks 11 which hereinafter is referred to in the singular as the draw track 11. The lower pair of said longitudinally extending members 8 similarly provide guides 12 for the bottom courses of said endless drive chains 10 and opposed channel-shaped carriage return tracks 14, hereinafter referred to as return track 14.

The draw and return tracks 11 and 14 are interrupted as at 15 to accommodate the drive cross bar which extends between said chains 10 as is fully discussed under the heading "III. The Carriage Drive Mechanism."

Adjacent the opposite ends of said carriage and chain guide structure 5 are the carriage transfer mechanisms (discussed under the heading "IV") for shifting the draw carriages 20 alternately from a position in alignment with one of the tracks 11 or 14 to a position in alignment with the other of said tracks 14 or 11 preparatory to starting the return and drawing movements thereof.

II. THE DRAW CARRIAGES AND WORKPIECE GRASPING JAWS

The draw carriages 20, two of them being employed in the present draw bench, are each provided with oppositely extending trunnions 21, preferably three sets, equipped with rollers 23 engageable in the respective draw and return tracks 11 and 14 and so arranged that during movement of each set of opposed rollers 23 across the gap 15 in the tracks, the other two sets of rollers 23 will support the carriage 20 for straight-line, accurate movement in a direction parallel to the axis of the dies 3.

As best shown in Figs. 4, 5, and 6, each carriage 20, adjacent one end thereof, is formed with pairs of relatively converging dove-tail slots 24 for a corresponding number of pairs of cooperating workpiece grasping jaws 25, said pairs of jaws being provided with serrated or like inner surfaces 26 between which the pointed ends 27 of tubes T or like workpieces are adapted to be firmly gripped. When the pairs of jaws 25 are moved toward the left as viewed in Fig. 5, the slidably interfitting carriage and jaw dovetails will effect a separation of the jaws, and conversely, when the said jaws 25 are moved toward the right, they will be urged toward each other to thus grip the pointed end 27 of a tube T therebetween. Of course, as many pairs of jaws 25 will be provided as there are dies 3, each pair of jaws being centered with respect to the axis of the respective die 3.

Each pair of jaws 25 is transversely slidably mounted upon a pin 28 of a cross head 29. Slidably mounted on the shaft 30 of said cross head is a tubular member 31 to which a link 32 is pivotally secured, said link being actuated as by means of a bell crank 34 to move said cross head and thus the jaws 25 in opposite directions with respect to the carriage 20. In order to enable firm grasping of all of the pointed ends 27 of the tubes T, a spring 35 is interposed between said tubular member 31 and said cross head 29, whereby each pair of jaws 25 will grip the pointed end 27 of a tube T therebetween irrespective of any slight variations in the sizes or cross-section shapes of such pointed ends 27.

There are preferably a pair of the aforesaid bell cranks 34 pivotally mounted adjacent the rear end and opposite sides of each said carriage 20 on the pins 36, and a bar 37 extends between the short arms of said bell cranks to which bar the links 32 are pivotally connected whereby, upon swinging of said bell cranks 34 from the dot-dash line position of Fig. 4 to the solid line position, all five pairs of jaws 25 will be simultaneously actuated by their respective links 32 to grip the pointed ends 27 of the workpieces or tubes T therebetween.

The ends of the cross head shafts 30 may be guided in suitable brackets 38. Nuts 39 are threaded onto said shafts 30 to provide shoulders against which the tubular members 31 abut to positively draw the jaws 25 rearward to workpiece releasing position.

In order that the pointed ends 27 of the tubes T may be inserted through the dies 3 before a carriage 20 is shifted transversely to a position aligned with the die axes, the upper front end portion of each carriage is formed with a series of slots 40 so that, when said carriage 20 is moved upwardly behind die mount 2, the pointed ends 27 of the tubes T pass through the slots 40 to a position in between the respective pairs of jaws 25.

III. THE CARRIAGE DRIVE MECHANISM

Reference has previously been made to the carriage drive chains 10 which are arranged so that the top courses thereof are above the draw track 11 and the bottom courses thereof are below the return track 14. Said chains 10 are trained over idler sprocket wheels 45 which are rotatably supported on standards 46. Said chains 10 are also trained over a pair of drive sprocket wheels 47 rotatably mounted on similar standards 46, said wheels 47 being non-rotatably secured on shafts 48 which have drive gears 49 thereon meshing with pinions 50, the latter in turn being non-rotatably keyed on a cross shaft 51 journalled in brackets 52, said cross shaft 51 being driven as by means of an electric motor 53 operatively coupled, in well known manner, to said shaft 51 through a gear reducer or like device 54.

From the foregoing, it is now clear that when the drive sprocket wheels 47 are driven in a counter-clockwise direction as viewed in Fig. 1, the top courses of the drive chains 10 will travel toward the left in a direction away from the dies 3, and the bottom courses thereof will travel in the opposite direction.

A pair of cross bars 56 are connected across the respective chains 10, and the long arms of the two pairs of bell cranks 34 are pivotally secured to the respective bars 56, whereby as the chains travel around the sprocket wheels 45 and 47, the cross bar 56 traveling along the top course of said chains 10 will be effective to pull the associated carriage 20 along draw track 11, and the other cross bar 56 traveling along the bottom course will push the associated carriage 20 along return track 14. The spacing of said cross bars 56 is such that, as one carriage 20 is moved in the draw direction, the other carriage 20 is moved in the return direction.

IV. THE CARRIAGE TRANSFER AND JAW OPERATING MECHANISMS

(a) The carriage transfer mechanism

Adjacent the opposite ends of said carriage and chain guide structure 5 are front and rear track sections 60, each of which is vertically reciprocably guided on posts 61 for movement alternately from a position aligned with one of the tracks 11 or 14 to a position aligned with the other said tracks. Thus, when one carriage 20 is in the solid line position adjacent the dies 3 as shown in Fig. 1, the respective front track section 60 is aligned with the draw track 11 while the other carriage 20 in the rear track section 60 is aligned with the return track 14. Therefore, when the upper one of the two carriages 20 is drawn toward the left, it will engage in the draw track 11, and when the bottom carriage is pushed toward the right, it will engage in the return track 14.

The mechanism now to be described is effective to vertically shift the track sections 60 after the carriages 20 are disengaged therefrom so that the rear track section 60 is moved upward into a position aligned with the draw track 11 so as to constitute, in effect, an extension thereof; and likewise the front track section 60 is shifted downwardly to a position aligned with the return track 14 so as to receive therein the returning carriage 20 and thus constitute, in effect, an extension of said return track.

The shifting mechanism is here shown as comprising a bifurcated lever 65 pivotally mounted on a standard 67 disposed adjacent to and in between the drive sprocket wheels 47. The bifurcated end of said lever is adapted, when in the dot-dash line position shown in Fig. 1 or solid line position shown in Fig. 2, to receive therein the cross bar 56 and as the chains 10 pass over the drive sprocket wheels 47, the engagement of said bar 56 with lever 65 will be effective to swing the lever to the solid line position of Fig. 1. A cross bar 66, to which lever 65 is keyed, transmits such swinging of lever 65, through links 68 and 69 to bell cranks 70 which are operatively engaged with the rear track section 60. Said bell cranks 70 are pivotally mounted on standards 71, and because of the arcuate movements of their ends of the bell cranks, elongated slots 72 are formed therein to engage opposite pins 73 of the rear track section 60. Thus, the rear track section 60 is shifted vertically downward to the solid line position as a consequence of the swinging of lever 65 to the solid line position of Fig. 1.

In order to effect an upward movement of the front track section 60, bars 74 are connected to the links 69 at one end and to bell cranks 75 at the other end, the latter being pivoted on die mount 2, and again pin 73 and slot 72 connections are employed at the connections of bell cranks 75 to the front track section 60. Thus the left-hand movement of the bars 74 consequent to swinging of the lever 65 to solid line position in Fig. 1 effects swinging of the bell cranks 75 from the dot-dash line position to the solid line position, thus raising the front track section 60 to a position aligned with the axes of dies 3 and with draw track 11.

For the purpose of returning this mechanism to a position so that lever 65 will again be swung clockwise when engaged by the other cross bar 56, so that the carriage 20 pulled along the draw track 11 will enter the rear track section 60, and so that the carriage 20 returning along the return track 14 will enter the front track section 60, a lever 76 is pivotally mounted on a bracket 78 and is operatively connected to the bars 74 so that, as the bottom carriage 20 moves toward the right in Fig. 1, said lever 76 will be swung to the dot-dash line position to thus restore the mechanism to the position aforesaid whereat it will remain until the other cross bar 56 swings the lever 65 down to the solid line position.

(b) Jaw operating mechanism

As previously pointed out with reference to the detail structure of the workpiece gripping jaws 25, they are opened and closed by the swinging of the bell cranks 34. As the cross bars 56 travel around the idler sprocket wheels 45, and as the front carriage 20 is being raised to drawing position, the jaws 25 are open so that the pointed ends 27 of the tubes T pass through the slots 40 of said carriage to a position between said jaws. Now, as the long arms of the bell cranks 34 are raised with respect to said carriage 20, the short arms thereof will be effective to actuate the links 32 in a direction to effect movement of the jaws 25 to workpiece gripping position, and the workpieces will remain so gripped so long as the cross bar 56 is traveling along the top course of the chains 10 and pulling the carriage 20 therewith. Now, as the cross bar 56 travels down around the drive sprocket wheels 47, the long arms of the bell cranks 34 are swung downward to draw rearward the links 32 to effect opening of the jaws 25 to release the drawn tubes T which will drop down onto an unloading rack 79 shown in dot-dash lines in Fig. 7, said rack being inclined so that the drawn tubes T roll or slide therealong and are discharged from the low end thereof onto a suitable truck or the like for transportation to another draw bench for a succeeding drawing operation or for transportation elsewhere for other finishing operations.

OPERATION OF DRAW BENCH

Assuming that the draw bench has previously been stopped in a position with one draw carriage 20 just having concluded its drawing movement and the other carriage 20 having concluded its return movement, that is, said one carriage 20 being engaged (wholly or partially) in the rear track section 60 aligned with draw track 11, and said another carriage 20 being engaged (wholly or partially) in the front track section 60 aligned with return track 14. With the parts of the draw bench in this position, the operator loads the pointed tubes T from the loading rack 4 onto the top set of mandrels of the tube loader. He then rotates the loader to align the mandrels and the tubes T thereon with dies 3 to thus position the other set of mandrels at the top for threading of pointed tubes T thereonto. The mandrels thus aligned with the dies 3 may then be shifted axially to operating position to shove the pointed ends 27 of the tubes T through the dies 3. Obviously, insofar as the present invention is concerned, the insertion of the tube ends through the dies 3 need not be effected by axial movement of said mandrels but, instead, rollers or the like may be employed.

Now, the electric drive motor 53 may be started, whereupon the cross bar 56 of the rear top carriage 20 engages the lever 65, and through the links 68 and 69 and bell cranks 70 the rear track section 60 is moved downward to align said rear carriage 20 with the bottom return track 14; and at the same time, through the bars 74 and bell cranks 75, the front carriage 20 is shifted upward through upward movement of the front track section 60 to a position aligned with the draw track 11.

Such upward movement of the front draw carriage 20 positions the open jaws 25 thereof so that the pointed ends 27 of the tubes T are disposed therebetween for clamping.

As the long arms of the bell cranks 34 are swung upwardly as the chains 10 pass around idler sprocket wheels 45, the jaws 25 are closed upon the pointed ends 27 of the tubes T to thus grip the same, and as the bell cranks 34 are pulled by the drive chains 10, the carriage 20 is pulled therewith to thus draw the tubes T through the dies 3, the carriage 20 then being engaged in the draw track 11.

During the drawing operation, the operator has ample time within which to thread tubes T upon the top set of mandrels of the loader.

At the same time that one carriage 20 is drawing tubes T through the dies 3, the other carriage 20 is being pushed along the return track 14; and during the course of such travel, said other carriage trips the lever 76 which actuates the rods 74 so as to restore the track sections 60 to their opposite positions, that is, positions whereat the rear track section 60 is aligned with the draw track 11, and the front track section 60 is aligned with the return track 14. Such movement of the rods 74 also returns the lever 65 to the dot-dash line position of Fig. 1 (the solid line position of Fig. 2.)

As the carriage 20 moving along the draw track 11 approaches the end of its stroke, the cross bar 56 thereof engages lever 65, whereupon the downward swinging of the bell cranks 34 effect opening of the jaws 25 to release the drawn tubes T; and continued longitudinal travel of said draw carriage 20 with respect to the drawn tubes T disengages the latter from said jaws 25, whereupon the drawn tubes T drop down onto the unloading rack 79.

As aforesaid, during the drawing movement of one carriage, the other carriage 20 is in the course of its return movement toward the die mount 2, that is, it ultimately enters the front track section 60.

After the tubes T have been drawn through the dies 3, the operator rotates the tube loader to position the next series of pointed tubes T in alignment with the dies 3 and shoves the pointed ends thereof through said dies.

As the cross bar 56 moves with the chains 10 around the drive sprocket wheels 47, the lever 65 is swung from the position of Fig. 2 to the solid line position of Fig. 1 to effect a downward shifting of the rear track section 60 and the carriage 20 engaged therein, and an upward shifting of the front track section 60 and carriage 20 therein, the new set of tubes T being gripped as before described and the above-described cycle of operation is repeated.

As evident from the foregoing, the operator need not wait for the return of a draw carriage 20 as was necessary in the prior art draw benches which employed single tracks or guides along which a single carriage was reciprocated back and forth with respect to the dies. Here, the operator has adequate time for threading of tubes onto mandrels; and, of course, it takes very little time to actuate the tube loader to position the tubes in alignment with the dies 3 and to shove the pointed ends 27 of the tubes T through said dies, this step of the operation being accomplished in the time interval between the passing of the ends of the drawn tubes through the dies 3 and the passing of the front carriage 20 from its bottom return position to its top drawing position.

Although the present invention has been described particularly with reference to the drawing of tubes, it is to be understood that the principles of the invention can, as well, be applied to other workpieces. It is also to be understood that the draw and return tracks 11 and 14 need not necessarily be disposed one above the other but can be side-by-side, if desired. Moreover, the carriage shifting may involve, for example, a swinging movement of front and rear track sections rather than straight-line movement as disclosed herein.

Other modes of applying the principle of the invention may be employed, change being made as regards the details described, provided the features stated in any of the following claims, or the equivalent of such, be employed.

I therefore particularly point out and distinctly claim as my invention:

1. In drawing apparatus; a die; a pair of generally parallel tracks, one of which is longitudinally aligned with said die; at least two carriages each equipped with workpiece gripping jaws; an endless chain trained over sprocket wheels to provide oppositely moving courses generally parallel to said tracks; draw bars pivotally connected to said carriages and to said chain at spaced intervals to move said carriages in opposite directions along the respective tracks; and transfer means operated by said draw bars as the chain portions to which said draw bars are connected pass around a sprocket wheel to shift the carriages from one to the other of said tracks.

2. The apparatus of claim 1 wherein said draw bars are operatively connected to said jaws to respectively open and close the same as the portions of said chain to which said draw bars are connected pass around said sprocket wheels.

3. In drawing apparatus; a die; a pair of generally parallel tracks, one of which is longitudinally aligned with said die; at least two carriages each equipped with workpiece-gripping jaws; an endless drive chain trained over sprockets wheels to provide oppositely moving courses generally parallel to said tracks; draw bars pivotally connected to the respective carriages and to said endless chain at longitudinally spaced intervals such that, while one carriage is moved by said chain along said one track in a direction away from said die, the other carriage is moved by said chain along the other track in a direction toward said die; a carriage transfer mechanism comprising two track sections each disposed adjacent an end of said tracks, and means supporting the respective track sections for movement transversely from a position registering with one end of said one track to a position registering with the corresponding end of the other track and from a position registering with the other end of said other track to a position registering with the corresponding end of said one track, said track sections constituting alternate extensions of said tracks into which said carriages move for transfer from one track to the other; and jaw-actuating means operatively connected to said draw bars for gripping a workpiece responsive to swinging of the draw bars in one direction as said chain passes around one sprocket wheel and for releasing a drawn workpiece responsive to swinging of said draw bars in the opposite direction as said chain passes around another sprocket wheel.

4. In drawing apparatus; a die; a pair of generally parallel tracks, one of which is longitudinally aligned with said die; at least two carriages each equipped with workpiece-gripping jaws; an endless drive chain trained over sprocket wheels to provide oppositely moving courses generally parallel to said tracks; draw bars pivotally connected to the respective carriages and to said endless chain at longitudinally spaced intervals such that, while one carriage is moved by said chain along said one track in a direction away from said die, the other carriage is moved by said chain along the other track in a direction toward said die; a carriage transfer mechanism comprising two track sections each disposed adjacent an end of said tracks, and means supporting the respective track sections for movement transversely from a position registering with one end of said one track to a position registering with the corresponding end of the other track and from a position registering with the other end of said other track to a position registering with the corresponding end of said one track, said track sections constituting alternate extensions of said tracks into which said carriages move for transfer from one track to the other; and transfer mechanism actuating means operatively engaged by said chain as the latter passes around a sprocket wheel to move said track sections as aforesaid.

5. The apparatus of claim 4 wherein said transfer mechanism actuating means has an operating element actuated by a course of said chain to restore the track sections to a position to receive the shifted carriages therein.

6. The apparatus of claim 4 wherein jaw-actuating means are operatively connected to said bars for gripping a workpiece responsive to swinging of the draw bars in one direction as said chain passes around one sprocket wheel and for releasing a drawn workpiece responsive to swinging of said draw bars in the opposite direction as said chain passes around another sprocket wheel.

7. In drawing apparatus; a die; a pair of generally parallel tracks, one of which is longitudinally aligned with said die; at least two carriages each equipped with workpiece-gripping jaws; means for successively driving said carriages first along said one track in a direction away from said said die and then along the other one of said tracks in the opposite direction; transfer means, effective at the conclusion of the drawing and return movements of said carriages, to shift the latter from one to the other of said tracks whereby the carriage thus shifted at the end of its return movement is ready to grip the next workpiece and to commence the drawing thereof; said means for successively driving said carriages comprising an endless drive chain trained over sprocket wheels to provide oppositely moving courses generally parallel to said tracks, said carriages being connected to said chain at spaced intervals therealong such that, as one carriage approaches the end of its drawing movement, the other carriage approaches the end of its return movement; and means for actuating said jaws to respectively release a drawn workpiece to grasp a successive workpiece responsive to passing of the chain portions to which said carriages are connected around said sprocket wheels, said transfer means comprising a track section disposed at each end of said pair of tracks, and means supporting said track sections for alternate movement from positions respectively aligned with one end of one track and with the other end of the other track to positions respectively aligned with the corresponding ends of said other and said one track, said track sections being designed to receive the respective carriages therein for transfer from one to the other of said tracks and to be actuated responsive to passing of the chain portions to which said carriages are connected around a sprocket wheel.

References Cited in the file of this patent

UNITED STATES PATENTS

| | | |
|---|---|---|
| 1,021,296 | Ault | Mar. 26, 1912 |
| 1,124,757 | Lloyd | Jan. 12, 1915 |
| 1,550,929 | Strauss | Aug. 25, 1925 |
| 1,577,589 | Rapp | Mar. 23, 1926 |
| 1,672,092 | Russell | June 5, 1928 |
| 1,704,342 | Redpath et al. | Mar. 5, 1929 |
| 1,911,157 | Leech | May 23, 1933 |
| 2,320,739 | Knudsen et al. | June 1, 1943 |
| 2,391,908 | Knudsen et al. | Jan. 1, 1946 |
| 2,472,231 | Rodder | June 7, 1949 |
| 2,536,637 | Garwig | Jan. 2, 1951 |

FOREIGN PATENTS

| | | |
|---|---|---|
| 774,681 | France | Dec. 11, 1934 |